US006501717B1

(12) United States Patent
Yamazaki

(10) Patent No.: US 6,501,717 B1
(45) Date of Patent: Dec. 31, 2002

(54) APPARATUS AND METHOD FOR PROCESSING DIGITAL AUDIO SIGNALS OF PLURAL CHANNELS TO DERIVE COMBINED SIGNALS WITH OVERFLOW PREVENTED

(75) Inventor: Takahiro Yamazaki, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/307,917

(22) Filed: May 10, 1999

(30) Foreign Application Priority Data

May 14, 1998 (JP) .......................................... 10-131872

(51) Int. Cl.[7] ................................................ G11B 7/005

(52) U.S. Cl. ................................ 369/47.16; 369/47.25; 369/47.28; 369/53.31; 700/94; 381/97; 381/108; 381/119

(58) Field of Search ...................... 369/4, 47.25, 47.28, 369/53.31, 89, 90, 91, 124.11, 124.14, 47.33, 59.15, 59.2, 47.16; 704/500–504; 381/20–23, 94.2, 94.8, 97, 108, 119; 341/100; 700/94

(56) References Cited

U.S. PATENT DOCUMENTS 4,107,463 A * 8/1978 Pearson ....................... 369/91
4,876,719 A * 10/1989 Nakagami et al. ............. 381/1
5,189,562 A * 2/1993 Greene ........................ 360/13
5,319,713 A * 6/1994 Waller, Jr. et al. ............ 381/22
5,402,500 A * 3/1995 Sims, Jr. ..................... 381/119
5,434,922 A * 7/1995 Miller et al. .................. 381/57
5,701,346 A * 12/1997 Herre et al. .................. 381/18
5,729,227 A * 3/1998 Park .......................... 341/100
5,771,295 A * 6/1998 Waller, Jr. ................... 381/18
5,841,993 A * 11/1998 Ho ............................ 710/102
5,870,365 A * 2/1999 Yoshizaki et al. ............ 369/48
5,870,480 A * 2/1999 Griesinger ................... 381/18
5,896,358 A * 4/1999 Endoh et al. ............... 369/889
6,023,490 A * 2/2000 Ten Kate .................... 375/240
6,173,024 B1 * 1/2001 Nanba et al. ............... 375/372

* cited by examiner

*Primary Examiner*—W. R. Young
(74) *Attorney, Agent, or Firm*—Frommer Lawrence & Haug LLP; William S. Frommer; Bruno Polito

(57) ABSTRACT

Level detectors detect levels of digital audio signals of individual channels. A controller predicts whether or not an overflow will take place corresponding to detected signals. When the controller predicts an occurrence of an overflow, attenuators attenuate a signal level of at least one channel. In addition, when variable length delaying devices vary the phases of signals, an overflow can be prevented.

27 Claims, 3 Drawing Sheets

APPARATUS AND METHOD FOR PROCESSING DIGITAL AUDIO SIGNALS OF PLURAL CHANNELS TO DERIVE COMBINED SIGNALS WITH OVERFLOW PREVENTED

BACKGROUND OF THE INVENTION

1. Background of the Invention

The present invention relates to an audio signal processing apparatus and an audio signal reproducing apparatus for use with for example a DVD reproducing apparatus.

2. Description of the Related Art

Most of sound tracks of movies performed in movie theaters are of surround type. In the latest surround system, a discrete multi-channel system of which signals are recorded in a digital format rather than a matrix format has been used. In such a system, a sound can be freely moved in forward, backward, leftward, rightward, and peripheral directions so as to create an impressive sound field with a presence effect.

In a large-storage disc-shaped record medium for use with a multimedia application such as a DVD, a record format has been standardized for satisfying demands of high picture quality and high sound quality. A DVD can record surround audio signals of digital 5.1-channels. FIGS. 3A and 3B show the comparison of channel structures and sound fields of the digital 5.1-channel system and a conventional analog four-channel system.

FIG. 3A shows the channel structure and sound field of the analog four-channel system. The analog four-channel system is composed of four channels that are L (front left), C (front center), R (front right), and S (surround) channels. FIG. 3B shows the channel structure and sound field of the digital 5.1-channel system. The digital 5.1-channel system is composed of five channels that are L (front left), C (front center), R (front right), Ls (rear left), and Rs (rear right) channels and 0.1 channel of LFE (Low Frequency Effect) channel. The LFE channel is used for a super woofer to reproduce an ultra low frequency component. The information capacity of the LFE channel is as small as 1/10 times the information capacity of each of other channels. Thus, the LFE channel is referred to as 0.1 channel.

The DVD reproducing apparatus is structured corresponding to the digital 5.1-channel system. Thus, the DVD reproducing apparatus can reproduce audio signals of 5.1 channels. In addition, the DVD reproducing apparatus has an audio signal processing apparatus that performs a down-mixing process corresponding to the conventional two-channel stereo audio system. When the audio signal processing apparatus performs the down-mixing process, signal levels of digital signals are attenuated so as to prevent excessive audio signals from being generated. The attenuated digital signals are calculated and then converted into analog signals. The analog signals are amplified again.

However, in a method for attenuating digital signals, if the LSB (Least Significant Bit) side is insufficient against the number of quantized original signals, when the signals are attenuated, information of the original signals is lost. Thus, even if the signal levels of the resultant signals are restored to the signal levels of the original signals, lost information on the LSB side is not restored. In other words, a nuance and so forth of music are lost. In addition, since digital signals are attenuated, analog signals are amplified. Thus, amplification factors of analog amplifiers should be raised. Consequently, since noise levels on the analog stage increase, noise of reproduced signals becomes conspicuous. In this case, unless the amplification factors of the analog amplifiers are raised, the users will sense a decrease in signal levels.

OBJECT AND SUMMARY OF THE INVENTION

Therefore, an object of the present invention is to provide an audio signal processing apparatus and an audio signal reproducing apparatus that perform a down-mixing process without deterioration of sound quality.

To solve the above-described problem, the invention of claim 1 is an audio signal processing apparatus for calculating audio signals of a plurality of channels and forming a combined audio signal, comprising a calculating means for calculating digital audio signals of a plurality of channels, a detecting means for detecting levels of the digital audio signals of the plurality of channels, and a means for predicting whether or not an occurrence of an overflow of the combined audio signal will take place corresponding to an output of a calculating process of the calculating means and an output of the detecting means and for attenuating a digital audio signal of at least one channel of the plurality of channels when the occurrence of the overflow has been predicted.

The invention of claim 2 is an audio signal processing apparatus for calculating audio signals of a plurality of channels and forming a combined audio signal, comprising a calculating means for calculating digital audio signals of a plurality of channels, a detecting means for detecting levels of the digital audio signals of the plurality of channels, and a means for predicting whether or not an occurrence of an overflow of the combined audio signal will take place corresponding to an output of a calculating process of the calculating means and an output of the detecting means and for varying the phase of a digital audio signal of at least one channel of the plurality of channels when the occurrence of the overflow has been predicted.

An audio signal reproducing apparatus, comprising a reproducing means for reproducing digital audio signals of a plurality of channels from a record medium, and a signal processing means for processing reproduced digital audio signals, wherein the signal processing means has a calculating means for calculating digital audio signals of a plurality of channels, a detecting means for detecting levels of the digital audio signals of the plurality of channels, and a means for predicting whether or not an occurrence of an overflow of the combined audio signal will take place corresponding to an output of a calculating process of the calculating means and an output of the detecting means and for attenuating a digital audio signal of at least one channel of the plurality of channels when the occurrence of the overflow has been predicted.

According to the present invention, when signals are down-mixed by a digital calculating process, if an occurrence of an overflow is predicted in a combined signal, an attenuating process or a phase varying process is performed. Since signals are not always attenuated, information on low order bit side can be prevented from being lost. In addition, since analog amplifiers do not need to compensate attenuated signal levels, noise can be prevented from increasing.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Next, with reference to the accompanying drawings, a DVD reproducing apparatus according to an embodiment of the present invention will be described. The DVD reproducing apparatus shown in FIG. 1 has a digital surround processor (DSP) 11 as an audio signal processing apparatus. The DSP 11 performs a decoding process for digital 5.1-channel signals corresponding to the above-described multi-channel discrete surround system and a calculating process for down-mixing signals.

Figure 1:
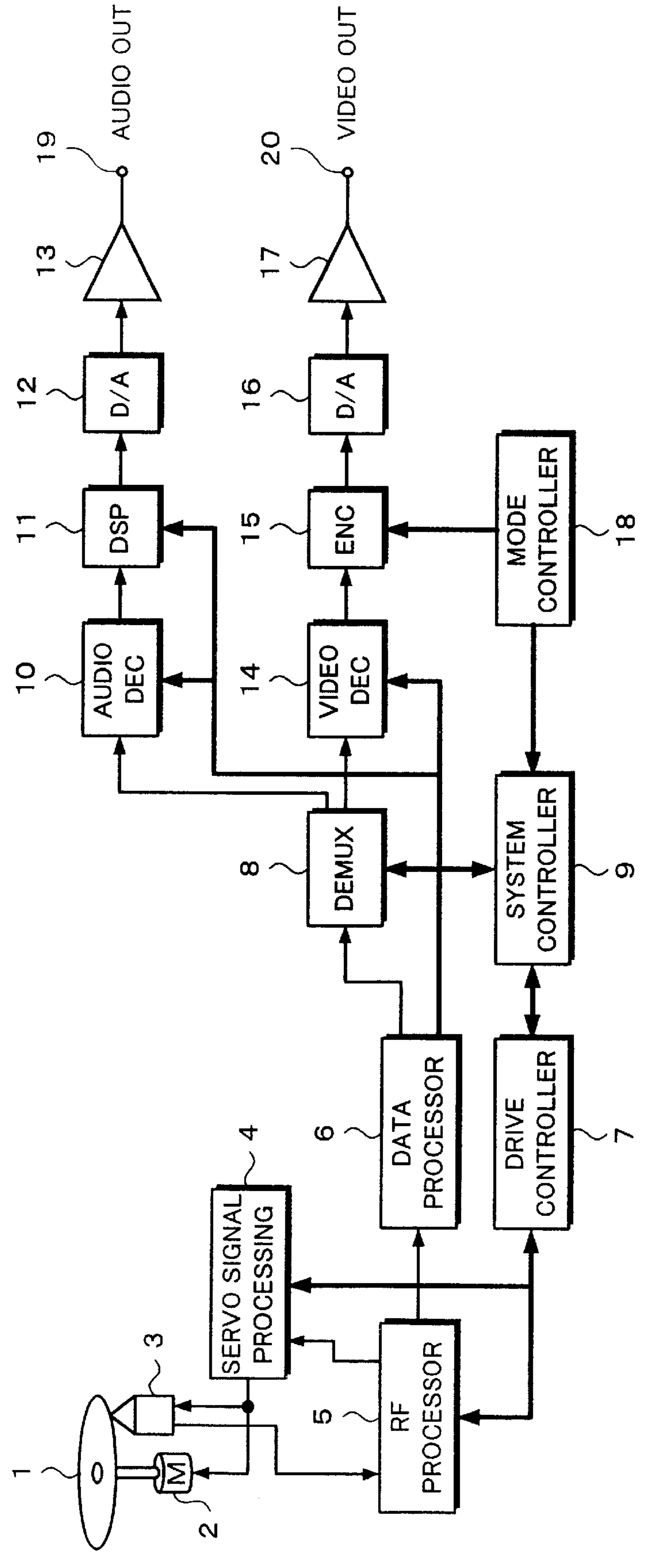
FIG. 1 is Block diagram showing the overall structure of an embodiment of the present invention.

In FIG. 1, reference numeral 1 is a DVD from which data is reproduced. The DVD 1 is rotated and driven by a spindle motor 2. An optical pickup 3 reads recorded data from the DVD 1. Data that is read by the optical pickup 3 is supplied to an RF processor 5. Control information is supplied from a drive controller 7 to the RF processor 5. The RF processor 5 converts an RF signal that is read from the DVD 1 into digital data corresponding to the control information received from the drive controller 7 and supplies the resultant digital data to a data processor 6. The RF processor 5 generates a tracking error signal, a focus error signal, and a spindle servo signal and supplies the generated signals to a servo signal processing portion 4.

The servo signal processing portion 4 performs a tracking controlling process, a focus controlling process, and a spindle controlling process corresponding to control information received from the drive controller 7. In addition, the servo signal processing portion 4 performs a thread controlling process for traveling the optical pickup 3 in the radial direction of the DVD 1. In FIG. 1, reference numeral 9 is a system controller. The system controller 9 centrally controls each portion connected through a data bus and generates a control signal. The control signal generated by the system controller 9 is supplied to a drive controller 7, a demultiplexer 8, an audio decoder 10, the DSP 11, and an MPEG video decoder 14.

The data processor 6 performs an ECC (Error Correcting) process and a decoding process for an output of the RF processor 5 and supplies the resultant data to the demultiplexer 8. The demultiplexer 8 separates a video stream and an audio stream from the output of the data processor 6. The separated video stream is supplied to the MPEG video decoder 14. The audio stream is supplied to the audio decoder 10.

The audio decoder 10 converts the audio stream into a digital audio signal/elementary stream. The digital audio signal/elementary stream is supplied to the DSP 11. The control signal is also supplied from the system controller 9 to the DSP 11. The DSP 11 performs a digital process for the digital audio signal/elementary stream received from the audio decoder 10 corresponding to the control information received from the system controller 9 and generates a predetermined digital audio signal.

In reality, the DSP 11 performs a decoding process for a multi-audio signal, a mixing/filtering process for mixing a low-pitched sound of the multi-audio signal to a particular channel and for outputting the resultant signal, a calculating process for virtually reproducing multi-channel sound sources with two channels, and a multi-channel output assigning process. The DSP 11 also performs an overflow preventing process (that will be described later). Output audio signals of the DSP 11 are supplied to a D/A converter 12. The D/A converter 12 converts the audio signals received from the DSP 11 into analog audio signals. The analog signals are supplied to an amplifier 13. Output signals of the amplifier 13 are obtained as reproduced audio signals from a terminal 19.

The video data stream separated by the demultiplexer 8 is supplied to the MPEG video decoder 14. The MPEG video decoder 14 decodes the video data stream. An output of the MPEG video decoder 14 is supplied to an encoder 15. Control information is also supplied from a mode controller 18 to the encoder 15. The encoder 15 converts digital video data received from the video decoder 14 into an NTSC/PAL format video signal corresponding to the control information. The mode controller 18 is connected to an external operating portion (not shown). The mode controller 18 generates the control information corresponding to switch operation states of the operating portion. The control information is supplied to the encoder 15 and the system controller 9. An output of the encoder 15 is supplied to a D/A converter 16. The D/A converter 16 converts the data received from the encoder 15 into an analog video signal. The analog video signal is supplied to an amplifier 17. An output of the amplifier 17 is obtained as a reproduced video signal from a terminal 20.

Next, one of processes performed in the DSP 11 will be described. When digital audio signals of 5.1 channels are down-mixed and stereo audio signals of two channels are virtually reproduced, audio signals Lo and Ro of two channels are generated by calculating the following formulas.

$$Lo=L+0.7C+0.7Ls \quad (1)$$

$$Ro=R+0.7C+0.7Rs \quad (2)$$

The calculating process for virtually reproducing multi-channel sound sources with two channels is an adding process. The mixing/filtering process for mixing a low-pitched sound as a part of a multi-audio signal to a particular channel is a complicated combining process. Thus, even signals of individual channels do not overflow, when they are combined, a combined signal may clip. To prevent this problem, the DSP 11 performs the overflow preventing process.

In other words, before the calculating process is performed, levels of signals of individual channels are detected. When an occurrence of an overflow of signals that will be calculated (combined) is predicted, the overflow preventing process is performed. In reality, one or a combination of processes (a) to (e) that follow is performed so as to prevent an overflow of signals from taking place.

(a) A higher level portion of a signal of each channel is compressed. (b) Only the main channel rather than all the channels is calculated. (c) The levels of signals of all channels that will be calculated are lowered. (d) The phase between signals that will largely affect an overflow is varied in such a manner that the signals do not clip. (e) Signals with larger levels of channels are selectively compressed.

Figure 2:
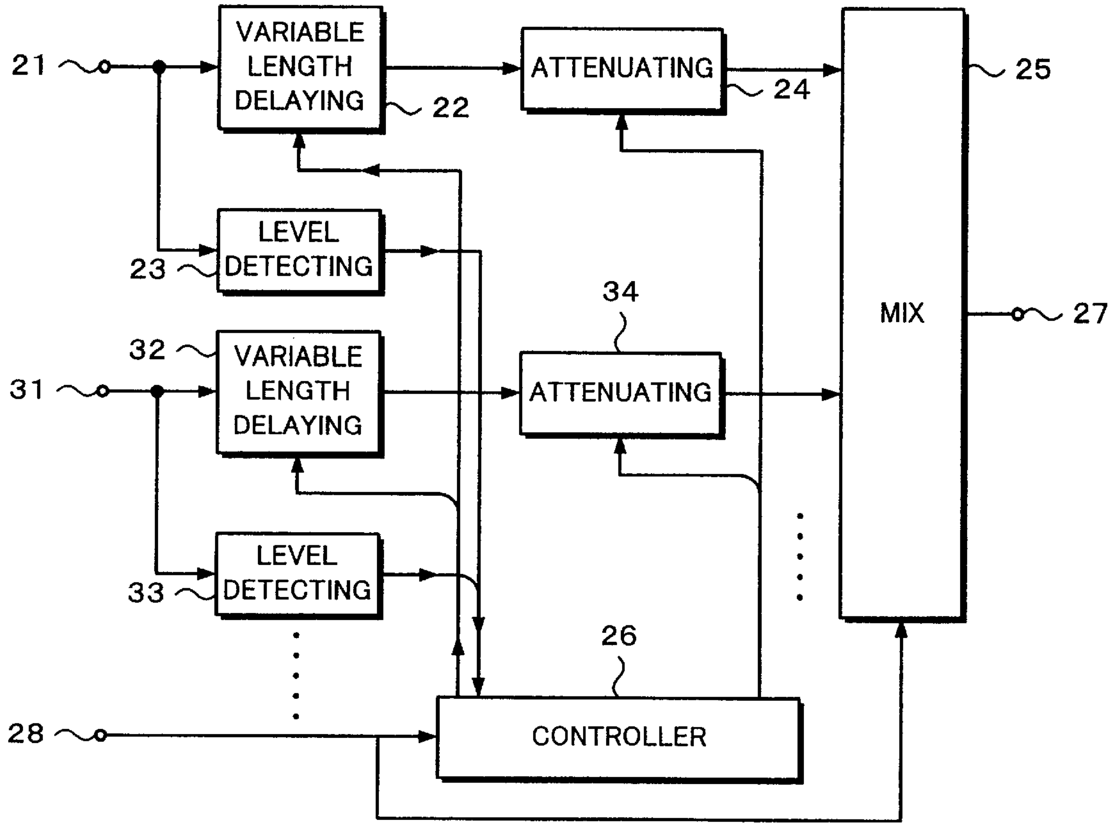
FIG. 2 is Block diagram showing the structure of a DSP according to the embodiment of the present invention.
Figure 3A:
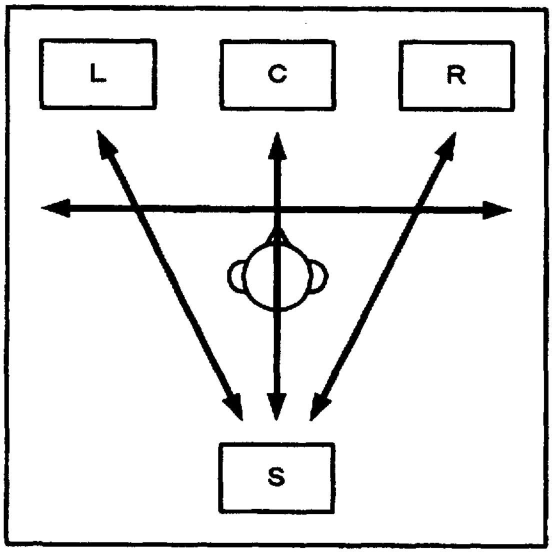
Fig. 3A ( PRIOR ART )
FIGS. 3A and 3B are schematic diagrams for explaining an example of a surround sound system.
Figure 3B:
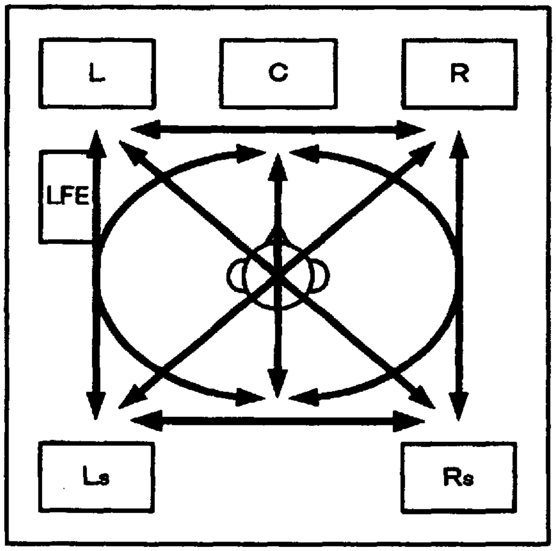
Fig. 3B ( PRIOR ART )

FIG. 2 shows an example of the structure of the DSP 11. In FIG. 2, for simplicity, a surround decoder is omitted from the DSP 11. The DSP 11 comprises variable length delaying devices 22, 32, . . . , level detectors 23, 33, . . . , attenuators 24, 34, . . . , a controller 26, and a mixer 25. The variable length delaying devices 22, 32, . . . , the level detectors 23, 33, . . . , and the attenuators 24, 34, . . . are disposed corresponding to individual channels. The controller 26 controls the variable length delaying devices 22, 32, . . . and the attenuators 24, 34, . . . corresponding to information detected by the level detectors 23, 33, . . . Thus, in the digital 5.1-channel system, the DSP 11 comprises six variable length delaying devices, six level detectors, and six attenuators. However, for simplicity, FIG. 2 shows only structural portions of two channels.

The variable length delaying devices 22, 32, . . . delay audio signals necessary for allowing the level detectors 23, 33, . . . to detect levels of signals and the controller 26 to generate the control signal. Instead of the variable length delaying devices, fixed delaying devices may be used. However, in this example, the variable length delaying devices 22, 32, . . . are used so as to perform the overflow preventing process (d). In addition, the attenuators 24, 34, . . . perform the other overflow preventing processes (a), (b), (c), and (e).

In FIG. 2, reference numeral 21 is an input terminal. A digital audio signal of a first channel is supplied from the input terminal 21 to a variable length delaying device 22 and a level detecting device 23. The level detecting device 23 detects the level of the digital audio signal of the first channel. The detected signal level is supplied to a controller 26. Likewise, the levels of digital audio signals of the other channels are detected. The detected levels are supplied to the controller 26.

An external control signal is supplied to the controller 26 and a mixer 25 through a terminal 28. The control signal designates a calculating process of the mixer 25 (in other words, a down-mixing type). In other words, the control signal designates the conventional two-channel stereo system or the conventional surround system as the down-mixing type. The controller 26 predicts whether or not the calculated result will overflow corresponding to the type of the down-mixing calculating process and the level detection signals of individual channels. The controller 26 generates control signals for the variable length delaying devices 22, 23, . . . and the attenuating devices 24, 34, . . . In other words, one or a combination of the above-described preventing processes (a) to (e) is accomplished.

In addition, the controller 26 detects the frequency of the compression of the upper level portion of the signal of each channel at predetermined intervals. When the controller 26 determines that the frequency exceeds a predetermined threshold value, the effect level of the overflow preventing process can be immediately or gradually increased. For example, not only the higher level (high order bit), but the entire signal level of each channel is attenuated.

When the preventing process for attenuating the entire signal level of each channel is performed, the frequency of which the peak level of each signal becomes a full-bit (corresponding to the positive or negative maximum value) is detected at predetermined intervals. When the controller 26 determines that the frequency is less than the predetermined threshold value, the preventing process may be alleviated or canceled so that the overall signal level is restored to the original signal level.

To prevent an overflow of signals from taking place, along with the level attenuating process, the amplification factors of the analog amplifiers may be controlled. However, it is not always to control the amplification factors of the analog amplifiers. In other words, according to the present invention, the levels of signals are attenuated only when there is a probability of which an overflow will take place. Generally, such a level attenuating process is on the order of several seconds. Thus, the listeners cannot know that the level attenuating process is performed.

According to the above-described embodiment, the present invention is applied to a DVD reproducing apparatus. However, the present invention can be also applied to an audio signal reproducing apparatus using a record medium other than a DVD. In addition, the present invention can be applied to a multi-channel system/surround system other than the digital 5.1-channel system. For example, the present invention can be applied to DTS (Digital Theater Systems).

According to the present invention, only when an occurrence of an overflow is predicted, an attenuating process is performed. Thus, in comparison with a system that always performs an attenuating process, information on the LSB side of an original signal can be suppressed from being lost. In addition, it is not necessary to raise the amplification factors of analog amplifiers. Thus, S/N ratios of the reproduced audio signals do not deteriorate. In an apparatus that does not compensate the amplification factors of the analog amplifiers, the levels of signals are reduced. Thus, the listeners may have a bad impression. However, according to the present invention, since the attenuating process can be performed in a short time without need to compensate the amplification factors of the amplifiers, the listeners do not perceive a decrease in signal levels.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. An audio signal processing apparatus comprising:

detecting means for detecting levels of digital audio signals of a respective plurality of channels;

predicting means for predicting, based on the detected levels, whether or not an overflow of at least one combined audio signal calculated in a predetermined manner from the digital audio signals having the detected levels will occur;

attenuation means for attenuating a portion of a digital audio signal of at least one channel of the plurality of channels when the predicting means predicts that an overflow will occur, to thereby prevent said overflow; and calculating means for calculating the at least one combined audio signal in said predetermined manner from the digital audio signals including the at least one attenuated digital audio signal;

whereby said predicting means detects the frequency of attenuation of said at least one digital audio signal and determines if the frequency exceeds a predetermined threshold and, when the frequency does exceed said predetermined threshold, said attenuation means attenuates the entirety of said digital audio signal of at least one channel.

2. The audio signal processing apparatus as set forth in claim 1, wherein only a higher level portion of the digital audio signal is attenuated.

3. The audio signal processing apparatus of claim 1, wherein each of said predicting means and said calculating means receives a control signal designating said predetermined manner by which the at least one combined audio signal is calculated.

4. The audio signal processing apparatus of claim 1, wherein said predetermined manner is a specified down-mixing process.

5. The audio signal processing apparatus of claim 4, wherein said plurality of channels is six channels of a digital 5.1-channel system, and said at least one combined audio signal is two combined signals forming respective left and right channels.

6. An audio signal processing apparatus comprising:

detecting means for detecting levels of digital audio signals of a respective plurality of channels;

predicting means for predicting, based on the detected levels, whether or not an overflow of at least one combined audio signal calculated in a predetermined manner from the digital audio signals having the detected levels will occur;

phase varying means for varying the phase of a digital audio signal of at least one channel of the plurality of channels when the predicting means predicts that an overflow will occur, to thereby prevent said overflow; and calculating means for calculating the at least one combined audio signal in said predetermined manner from the digital audio signals including the at least one phase varied digital audio signal.

7. The audio signal processing apparatus of claim 6, wherein each of said predicting means and said calculating means receives a control signal designating said predetermined manner by which the at least one combined audio signal is calculated.

8. The audio signal processing apparatus of claim 6, wherein said predetermined manner is a specified type of down-mixing process.

9. The audio signal processing apparatus of claim 8, wherein said plurality of channels is six channels of a digital 5.1-channel system, and said at least one combined audio signal is two combined signals forming respective left and right channels.

10. The audio signal processing apparatus of claim 6, wherein said phase varying means is a variable phase varying means.

11. The audio signal processing apparatus of claim 6, wherein said phase varying means provides a fixed phase change to said digital signal of said at least one channel.

12. An audio signal processing apparatus comprising:

detecting means for detecting levels of digital audio signals of a respective plurality of channels;

control means for predicting, based on the detected levels, whether or not an overflow of at least one combined audio signal calculated in a predetermined manner from the digital audio signals having the detected levels will occur, and controlling at least one of an attenuating and a phase varying operation upon a portion of one or more of said digital audio signals to prevent said overflow;

at least one of an attenuation means for performing said attenuating operation, and a phase varying means for performing said phase varying operation, under the control of said control means; and calculating means for calculating the at least one combined audio signal in said predetermined manner from the digital audio signals including the at least one attenuated and/or phase varied digital audio signal;

whereby said control means detects the frequency of occurrence of said at least one of said attenuating and said phase varying operations upon a portion of one or more of said digital audio signals and determines if the frequency exceeds a predetermined threshold and, when the frequency does exceed said predetermined threshold, said control means controls attenuation of the entirety of said one or more of said digital audio signals in lieu of performing said at least one of s aid attenuating and said phase varying operations.

13. The audio signal processing apparatus of claim 12, wherein each of said predicting means and said calculating means receives a control signal designating said predetermined manner by which the at least one combined audio signal is calculated.

14. The audio signal processing apparatus of claim 12, wherein said predetermined manner is a specified type of down-mixing process.

15. The audio signal processing apparatus of claim 14, wherein said plurality of channels is six channels of a digital 5.1-channel system, and said at least one combined audio signal is two combined signals forming respective left and right channels.

16. The audio signal processing apparatus of claim 12, wherein said apparatus includes both said attenuating means and said phase varying means.

17. An audio signal processing apparatus comprising:

a detecting section for detecting levels of digital audio signals of a respective plurality of channels;

a controller for predicting, based on the detected levels, whether or not an overflow of at least one combined audio signal calculated using a predetermined down-mixing operation upon the digital audio signals having the detected levels will occur, and controlling at least one of an attenuating and a phase varying operation upon a portion of one or more of said digital audio signals to prevent said overflow;

at least one of an attenuation section to perform said attenuating operation, and a phase varying section to perform said phase varying operation, under the control of said controller; and a mixer for down-mixing, in said predetermined manner, the digital audio signals including the at least one attenuated and/or phase varied digital audio signal, to derive said at least one combined audio signal;

whereby said controller detects the frequency of occurrence of said at least one of said attenuating and said phase varying operations upon a portion of one or more of said digital audio signals and determines if the frequency exceeds a predetermined threshold and, when the frequency does exceed said predetermined threshold, said controller controls attenuation of the entirety of said one or more of said digital audio signals in lieu of performing said at least one of said attenuating and said phase varying operations.

18. The audio signal processing apparatus of claim 17, wherein each of said controller and said mixer receives a control signal designating said predetermined manner by which the at least one combined audio signal is calculated.

19. The audio signal processing apparatus of claim 17, wherein said plurality of channels is six channels of a digital 5.1-channel system, and said at least one combined audio signal is two combined signals forming respective left and right channels.

20. An audio signal processing method comprising the steps of:

detecting levels of digital audio signals of a respective plurality of channels;

predicting, based on the detected levels, whether or not an overflow of at least one combined audio signal calculated in a predetermined manner from the digital audio signals having the detected levels will occur;

if overflow is predicted in said predicting step, performing at least one of attenuating and phase varying a portion of one or more of said digital audio signals to prevent said overflow; and deriving said at least one combined audio signal from said digital audio signals including said attenuated and/or phase varied digital audio signal;

whereby said method includes detecting the frequency of occurrence of said at least one of said attenuating and said phase varying operations upon a portion of one or more of said digital audio signals and determining if the frequency exceeds a predetermined threshold and, when the frequency does exceed said predetermined threshold, attenuating the entirety of said one or more of said digital audio signals in lieu of performing said at least one of said attenuating and said phase varying operations.

21. The audio signal processing method of claim 20, wherein said predetermined manner is a specific type of down-mixing process.

22. The audio signal processing method of claim 20, wherein said plurality of channels is six channels of a digital 5.1-channel system, and said at least one combined audio signal is two combined signals forming respective left and right channels.

23. The audio signal processing method of claim 20, wherein both said attenuating and said phase varying are performed to prevent overflow.

24. An audio signal reproducing apparatus comprising:

reproducing means for reproducing digital audio signals of a respective plurality of channels from a recording medium; and signal processing means for processing the reproduced digital audio signals;

wherein said signal processing means includes:

detecting means for detecting levels of the digital audio signals of the respective plurality of channels;

control means for predicting, based on the detected levels, whether or not an overflow of at least one combined audio signal calculated in a predetermined manner from the digital audio signals having the detected levels will occur, and controlling at least one of an attenuating and a phase varying operation upon a portion of one or more of said digital audio signals to prevent said overflow;

at least one of an attenuation means for performing said attenuating operation, and a phase varying means for performing said phase varying operation, under the control of said control means; and calculating means for calculating the at least one combined audio signal in said predetermined manner from the digital audio signals including the at least one attenuated and/or phase varied digital audio signal;

whereby said control means detects the frequency of occurrence of said at least one of said attenuating and said phase varying operations upon a portion of one or more of said digital audio signals, determines if the frequency exceeds a predetermined threshold and, when the frequency does exceed said predetermined threshold, said control means controls attenuation of the entirety of said one or more of said digital audio signals in lieu of performing said at least one of said attenuating and said phase varying operations.

25. The audio signal processing apparatus of claim 24, wherein each of said predicting means and said calculating means receives a control signal designating said predetermined manner by which the at least one combined audio signal is calculated.

26. The audio signal processing apparatus of claim 24, wherein said predetermined manner is a specified type of down-mixing process.

27. The audio signal processing apparatus of claim 26, wherein said plurality of channels is six channels of a digital 5.1-channel system, and said at least one combined audio signal is two combined signals forming respective left and right channels.

* * * * *